United States Patent
McChesney et al.

(10) Patent No.: US 12,163,405 B2
(45) Date of Patent: Dec. 10, 2024

(54) INCREASE POWER OUTPUT OF A DOWNHOLE TOOL GENERATOR ASSEMBLY

(71) Applicant: Halliburton Energy Services, Inc., Houston, TX (US)

(72) Inventors: Ryan W. McChesney, Carrollton, TX (US); Gregory T. Werkheiser, Carrollton, TX (US); Gordon McLeary, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/305,884

(22) Filed: Apr. 24, 2023

(65) Prior Publication Data

US 2024/0352830 A1   Oct. 24, 2024

(51) Int. Cl.
E21B 41/00 (2006.01)
H02K 7/20 (2006.01)

(52) U.S. Cl.
CPC ........... *E21B 41/0085* (2013.01); *H02K 7/20* (2013.01)

(58) Field of Classification Search
CPC .............................. E21B 41/0085; H02K 7/20
See application file for complete search history.

(56) References Cited

U.S. PATENT DOCUMENTS

| | | | |
|---|---|---|---|
| 4,246,531 A | 1/1981 | Jordan | |
| 4,415,823 A * | 11/1983 | Jurgens | E21B 4/00 310/90 |
| 8,853,879 B2 * | 10/2014 | Rytlewski | H02K 7/1823 290/54 |
| 9,598,937 B2 * | 3/2017 | Chen | E21B 47/20 |
| 2003/0116969 A1 * | 6/2003 | Skinner | E21B 41/0085 290/1 R |
| 2003/0131986 A1 * | 7/2003 | Schultz | H02K 7/1823 166/66.5 |
| 2008/0303490 A1 | 12/2008 | Xu et al. | |
| 2013/0000991 A1 * | 1/2013 | Scholz | H02K 49/106 310/104 |
| 2019/0178099 A1 * | 6/2019 | Gatzen | H02K 1/2788 |
| 2021/0172295 A1 * | 6/2021 | Fripp | H02J 7/34 |
| 2021/0332674 A1 * | 10/2021 | Greci | E21B 23/00 |
| 2023/0340860 A1 * | 10/2023 | Hoffman | F01D 15/10 |

FOREIGN PATENT DOCUMENTS

RU   2334099   9/2008

OTHER PUBLICATIONS

"PCT Application No. PCT/US2023/066208, International Search Report and Written Opinion", Jan. 18, 2024, 11 pages.

* cited by examiner

*Primary Examiner* — Steven A Macdonald
(74) *Attorney, Agent, or Firm* — DeLizio, Peacock, Lewin & Guerra LLP

(57) ABSTRACT

An apparatus configured to be positioned on a tubular string in a wellbore formed in a subsurface formation. The apparatus comprises a generator assembly disposed on the tubular string and configured to output power to a downhole tool. The generator assembly includes a first generator configured to output a first power to the downhole tool. The generator includes a second generator configured to function as an exciter for the first generator.

20 Claims, 3 Drawing Sheets

INCREASE POWER OUTPUT OF A DOWNHOLE TOOL GENERATOR ASSEMBLY

FIELD

Some implementations relate generally to the field of electric downhole tools positioned in a wellbore and more particularly to the field of increasing power output of a generator assembly of a downhole tool.

BACKGROUND

Tools may be positioned in a wellbore drilled in a subsurface formation to assist in controlling the flow of fluid in the wellbore. For instance, downhole tools may be utilized to control the flow of reservoir fluid as it flows from the subsurface formation to the surface. Generators may be disposed on the downhole tools to provide the downhole tools power such that the tools may function accordingly. The magnitude of the power output by the generators may depend on various factors including the rotational frequency of a rotor within the generator, the strength of the magnetic field of one or more permanent magnets within the generator, etc. Due to the wellbore structure, space may be limited, resulting in size constraints of the generators, and ultimately limiting the magnitude of the power output capabilities of the generator.

BRIEF DESCRIPTION OF THE DRAWINGS

Implementation of the disclosure may be better understood by referencing the accompanying drawings.

DESCRIPTION

Figure 1:
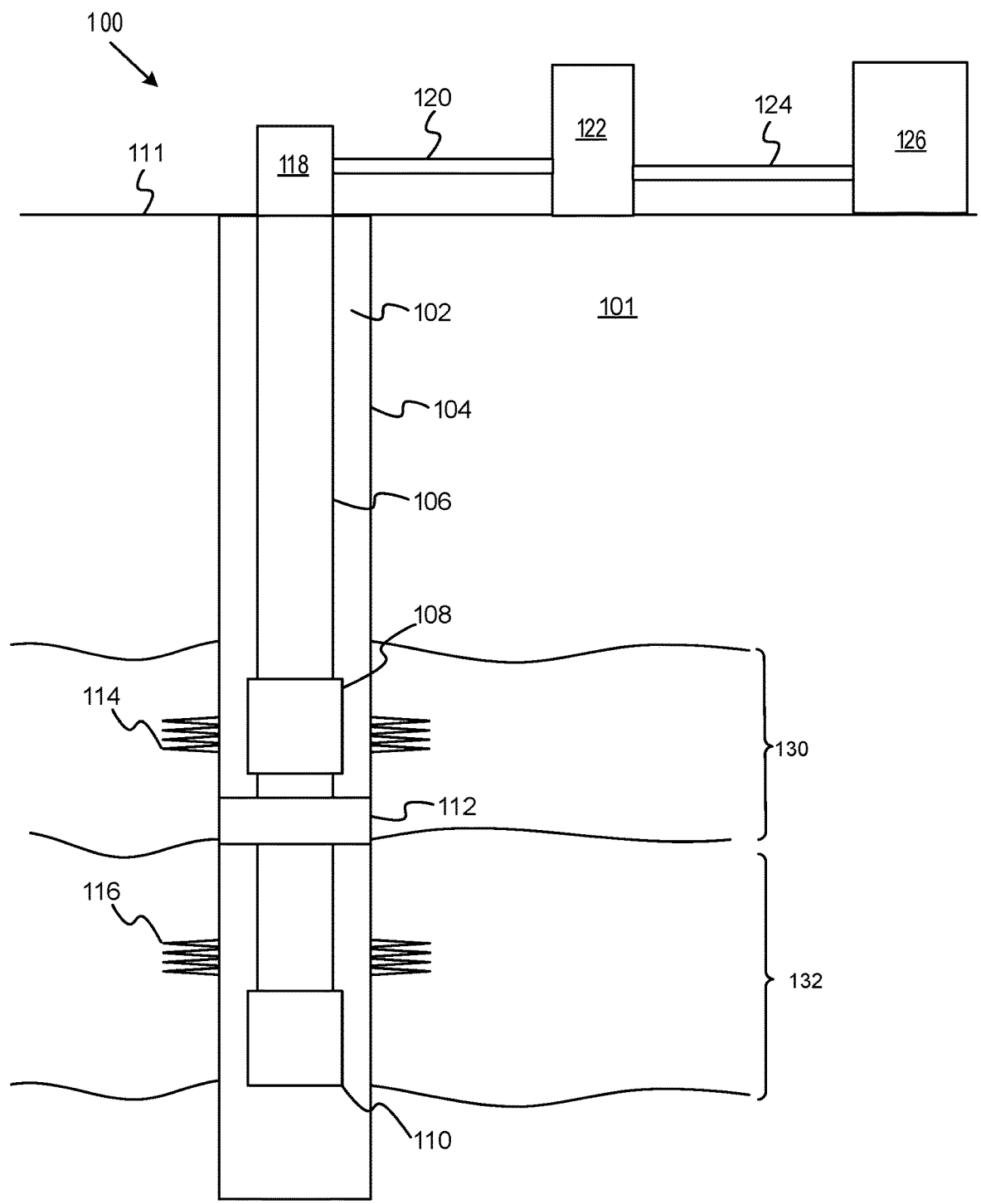
FIG. 1 is a diagrammatic illustration of an example well system, according to some implementations.

The description that follows includes example systems, methods, techniques, and program flows that embody aspects of the disclosure. However, it is understood that this disclosure may be practiced without these specific details. For instance, this disclosure refers to a generator assembly positioned in an inflow control device. Aspects of this disclosure can also be applied to any other configuration of a generator assembly disposed on a tubular string positioned in a wellbore. For clarity, some well-known instruction instances, protocols, structures, and techniques have been omitted.

Example implementations relate to enhancing the magnetic field of a rotor within a generator assembly to increase the power output of the generator assembly. In some implementations, a downhole too may be disposed on a tubular string that may be positioned in a wellbore formed in a subsurface formation. A generator assembly also may be disposed on the tubular string and proximate to the downhole tool, such that the downhole tool may function with the power output from the generator assembly. For example, the downhole tool may include a valve that may increase and/or decrease the flow of fluid into a tubing string positioned in a wellbore. The valve may operate via power provided by the generator assembly. In some implementations, the generator assembly may utilize the flow of fluid from the reservoir to output power. For example, the fluid flow may rotate a turbine in the generator assembly, thus rotating a rotor. The rotor may include a permanent magnet that, when rotated via the fluid flow, may induce a current in a stator due to the magnetic field of the rotor interacting with the stator, and thus outputting power from the stator of the generator to the downhole tool. Increasing the power output of the generator may require increasing the current induced on the stator. In some implementations, due to a constant magnetic field of the permanent magnet, the induced current may be increased by increasing the rotational frequency (e.g., rotations per minute (RPM)) of the permanent magnets (rotor). However, increasing the rotational frequency of the rotor may require excess energy. Additionally, the increase in rotational frequency may affect the stability of the generator assembly. A generator assembly configured to increase the power output for a downhole tool is described herein. The configuration of the generator assembly described herein may allow for the power output of the generator assembly to increase without increasing the space occupied in a wellbore by the generator assembly. Additionally, the configuration may allow for an increase in power output without increasing the rotational frequency of a turbine and potentially damaging the turbine and/or other components of a generator.

In some implementations, a generator assembly disposed on a tubular string, proximate a downhole tool, may include two or more generators. A first generator of the generator assembly may be configured to output power to the downhole tool. A second generator of the generator assembly may be configured to function as an exciter for the first generator to increase the power output of the first generator. For example, the rotor of the second generator may include one or more permanent magnets. As the permanent magnets are rotated (via fluid flow interacting with the turbine of the second generator), the magnetic field of the permanent magnets may induce a current on the stator of the second generator. In some implementations, the stator of the second generator may be electrically coupled to the rotor of the first generator such that the power output from the second generator is output to the first generator. In some implementations, the first generator's rotor may be configured with a field coil such that the power output from the second generator may increase the magnetic field of the first generator's rotor. Thus, as the first generator's rotor rotates (via fluid flow interacting with the turbine of the first generator), the current induced on the first generator's stator may be increased due to the increased magnetic field of its rotor, and subsequently the power output to the downhole tool, via the first generator, may be increased.

Example Systems

FIG. 1 is a diagrammatic illustration of an example well system, according to some implementations. In particular, a well system 100 of FIG. 1 includes a wellbore 102 in a subsurface formation 101. The wellbore 102 includes casing 104 and number of perforations 114, 116 being made in the casing 104. Each set of perforations 114, 116 is located in a respective reservoir 130, 132 to allow reservoir fluids (i.e., oil, water, and gas) from the respective reservoirs 130, 132 to flow into the wellbore 102 and into the tubular string 106 (the production tubing). The tubular string 106 includes a packer 112 that may prevent the comingling of fluids produced from the reservoirs 130, 132 in the wellbore 102. A production assembly 108 may allow the inflow of fluid produced from the reservoir 130 into the tubular string 106. Likewise, a production assembly 110 may allow the inflow of fluid produced from the reservoir 132 into the tubular string 106.

Each of the production assemblies 108, 110 may include one or more downhole tools (not pictured). In some implementations, the downhole tools may be configured to control the flow of fluid produced from the reservoirs 130, 132 and into the tubular string 106. The downhole tool may include one or more inflow control devices (ICD), one or more valves (e.g., a gas lift valve, a solenoid valve, etc.), etc. to control flow as fluid flows into the tubular string 106. In some implementations, the production assemblies 108, 110 may include one or more generator assemblies. In some implementations, each of the production assemblies 108, 110 may also include electronics to control (e.g., for controlling timing, directionality, and/or voltage threshold for powering and/or activating the downhole tool) the respective downhole tools. The electronics may utilize the power output from the generator assembly to control the downhole tools.

A flowline 120 coupled to the wellhead 118 of wellbore 102 and a separator 122 may allow the fluid produced up the tubular string 106 to flow to the separator 122. The separator 22 may be designed to separate the phases of the fluid produced from the wellbore 102. For instance, oil, water, and gas may be separated from each other after passing through the separator 122. The aggregate of fluid produced from wellbore 102 may then flow to a tank battery, via flowline 124, that may include components such as storage tank 126, to store the produced fluid.

Example Generator Assembly

Examples of a generator assembly are now described. The generator assembly is described in reference to the production assembly 108 and/or 110 of FIG. 1

Figure 2:
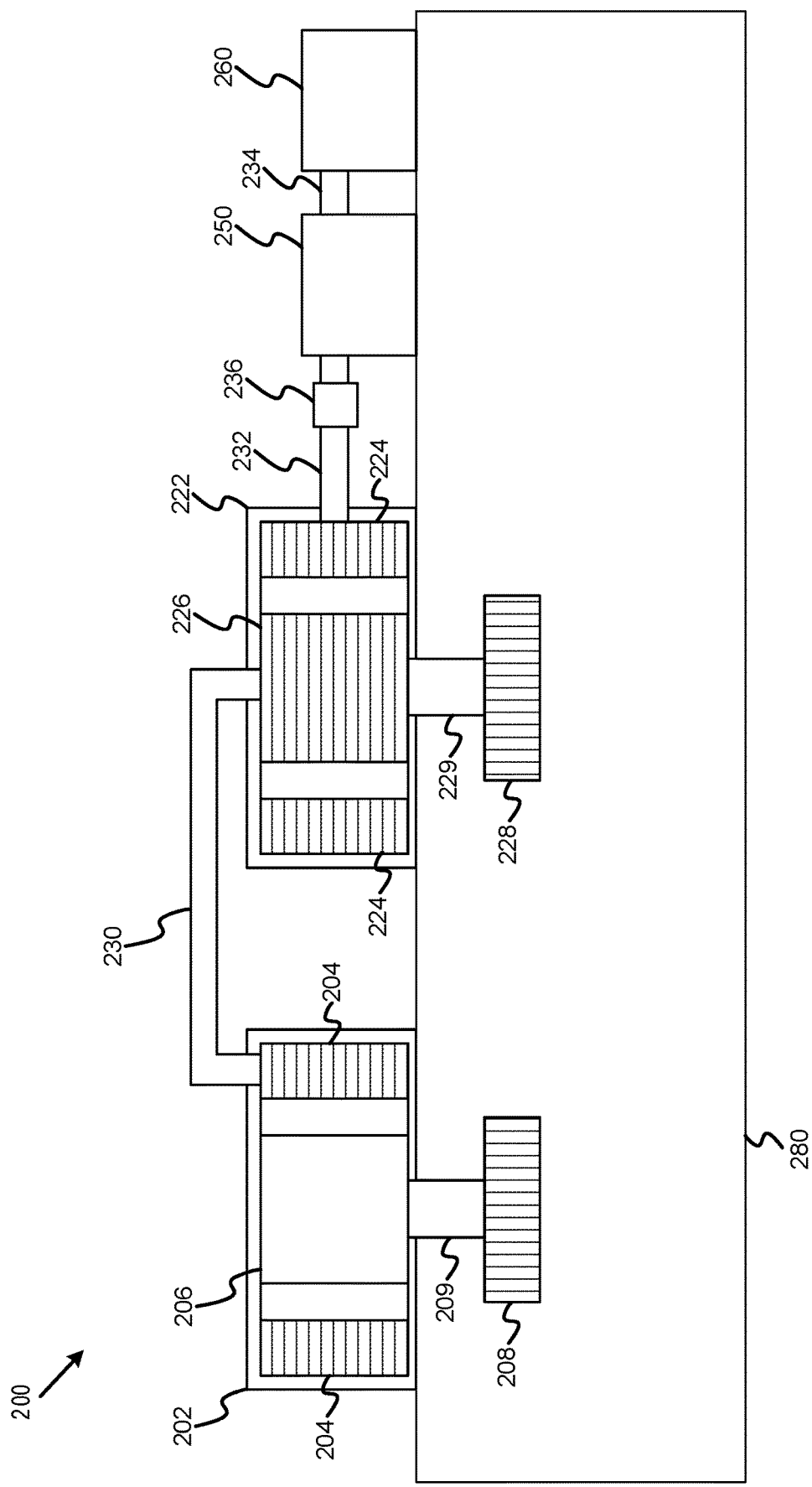
FIG. 2 is a block diagram illustrating an example generator assembly, according to some implementations.

FIG. 2 is a block diagram of an example generator assembly, according to some implementations. In particular, FIG. 2 includes a production assembly 200 (similar to the production assemblies 108, 110 of FIG. 1). The production assembly 200 includes a first generator 202 and a second generator 222. The first generator 202 and the second generator 222 may make up a generator assembly that may output power to a downhole tool 260 (e.g., an ICD, a gas lift valve, etc.) via electronics 250. The production assembly 200 also may include tubing 280 in which fluid may flow through. The flow of fluid may interact with the turbines 208, 228 of the first and second generators 202, 222, respectively, to output power from the generator assembly (as described below).

The first generator 202 may include a turbine 208. The turbine 208 may be located in the internal bore of the tubing 280 so that the turbine 208 may interact with fluid flowing through the tubing 280. For example, the turbine 208 may be configured to rotate about a central axis of the turbine 208 as fluid flows through the tubing 280. The first generator 202 may also include a rotor 206. The rotor 206 may include one or more permanent magnets. A shaft 209 may couple the rotor 206 to the turbine 208. The central axis of the turbine 208 may be central to the central axis of the shaft 209. Additionally, the central axis of the shaft 209 may be central to the central axis of the rotor 206. As the turbine 208 rotates (via fluid flow in the tubing 280), the rotor 206 may also rotate, via the rotation of the shaft 209, about the respective central axes. The first generator 202 also may include a stator 204. The stator 204 may at least partially surround the rotor 206. In some implementations, the stator 204 may be adjacent to the rotor 206. For example, FIG. 2 depicts the stator 204 as a radial flux type stator that surrounds the rotor 206. In some implementations, the stator 204 may be an axial flux type stator that may be adjacent (i.e., above) to the rotor 206. In some implementations, the stator 204 may remain stationary while the rotor 206 rotates. The stator 204 may include one or more coils comprising conductive material (e.g., copper). In some implementations, the rotor 206 and stator 204 may be disposed on the external face of the tubing 280. In some implementations, the stator 204 may be coupled to the turbine 208 such that the stator 204 may rotate and the rotor 206 may remain stationary. In some implementations, the rotor 206 and the stator 204 may be magnetically coupled. For example, the magnetic field of the rotor 206 may induce a current in the stator 204.

Similar to the first generator 202, the second generator 222 may include a turbine 228. The turbine 228 may be located in the internal bore of the tubing 280 so that the turbine 228 may interact with fluid flowing through the tubing 280. For example, the turbine 228 may be configured to rotate about a central axis of the turbine 228 as fluid flows through the tubing 280. The second generator 222 also may include a rotor 226. In some implementations, the rotor 226 may be configured with a ferromagnetic material (e.g., steel) and one or more field coils that may at least partially surround the ferromagnetic material. The field coils may be disposed on the stator 224 and/or the rotor 226. A shaft 229 may couple the rotor 226 to the turbine 228. The central axis of the turbine 228 may be central to the central axis of the shaft 229. Additionally, the central axis of the shaft 229 may be central to the central axis of the rotor 226. As the turbine 228 rotates, the rotor 226 may also rotate, via the rotation of the shaft 229, about the respective central axes. The second generator 222 also may include a stator 224. The stator 224 may at least partially surround the rotor 226. In some implementations, the stator 224 may be adjacent to the rotor 226. For example, FIG. 2 depicts the stator 224 as a radial flux type stator that surrounds the rotor 226. In some implementations, the stator 224 may be an axial flux type stator that may be adjacent (i.e., above) to the rotor 226. The stator 224 may remain stationary while the rotor 226 rotates. The stator 224 may include one or more coils comprising conductive material (e.g., copper). The rotor 226 and stator 224 may be disposed on the external face of the tubing 280. In some implementations, the stator 224 may be coupled to the turbine 228 such that the stator 224 may rotate and the rotor 226 may remain stationary. In some implementations, the rotor 226 and the stator 224 may be magnetically coupled. For example, the magnetic field of the rotor 206 may induce a current in the stator 204.

The generator assembly may include a conduit 230 to electrically couple the first generator 202 and the second generator 222. Specifically, the conduit 230 may include a conductive material (such as a copper wire) that may electrically couple the stator 204 to the field coils of the rotor 226 so that the first generator 202 may act as an exciter for the second generator 222. As the rotor 206 rotates (due to fluid flowing through the tubing 280), the magnetic field of the permanent magnets of the rotor 206 may induce a current in the coils of the stator 204, thus outputting power from the stator 204 of the first generator 202 to the rotor 226 of the second generator 222, via the conduit 230. The magnetic field of the rotor 226 may be increased due to the power supplied from the stator 204 of the first generator 202 to the field coils of the rotor 226 of the second generator 222. The increased magnetic field of the rotor 226 may result in an increase in the current induced on the stator 224), thus outputting an increased power from the second generator 222.

In some implementations, a conduit 232 may electrically couple the second generator 222 to electronics 250 of the production assembly 200. The electronics 250 may be electrically coupled to the downhole tool 260 via a conduit 234. Power output from the second generator 222 may supply the electronics 250 with power to control the downhole tool 260.

A rectifier 236 may be disposed on the conduit 232. In some implementations, the rectifier 236 may be positioned in one or more places on the production assembly 200. For example, the rectifier 236 may be positioned in the first generator 202 and/or the second generator 222, within the cables within conduit 230, etc. The rectifier 236 may be configured to cancel out the power output from the stator 224. The rectifier 236 may convert the alternating current (AC) of the stator 224 (generated by the rotation of the magnetic field of the rotor 226) to a direct current (DC). The DC may then be supplied to the electronics 250 via the conduit 232.

Example Operations

Example operations for increasing power output of a generator assembly are now described in reference to FIG. 2.

Figure 3:
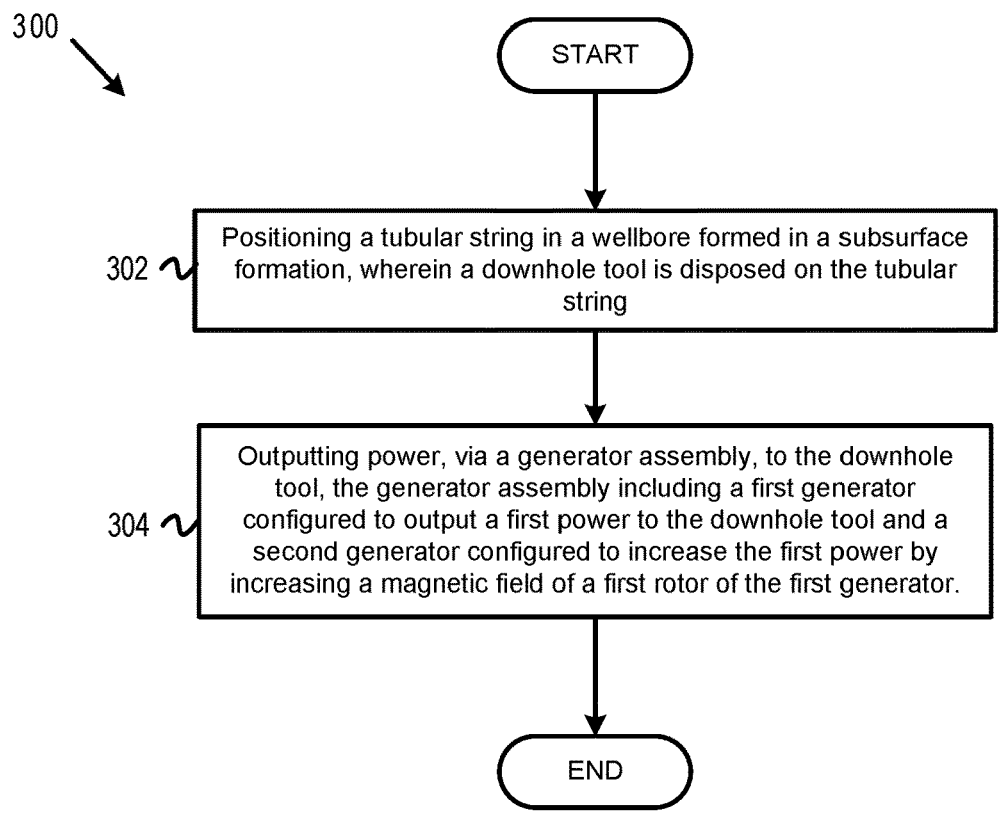
FIG. 3 is a flowchart illustrating example operations for increasing power output of a generator assembly, according to some implementations.

FIG. 3 depicts a flowchart of example operations for increasing power output of a generator assembly, according to some implementations. FIG. 3 depicts a flowchart 300 of operations to increase the magnetic field of a rotor of a first generator by utilizing the power output of a second generator. The operations of flowchart 300 are described in reference the production assemblies 108, 110 of FIG. 1 and production assembly 200 of FIG. 2.

At block 302, a tubular string may be positioned in a wellbore formed in a subsurface formation, wherein a downhole tool is disposed on the tubular string.

At block 304, power may be output, via a generator assembly disposed on the tubular string, to the downhole tool, the generator assembly including a first generator configured to output a first power to the downhole tool and a second generator configured to increase the first power by increasing a magnetic field of a first rotor of the first generator.

Example Implementations

Implementation #1: An apparatus configured to be positioned on a tubular string in a wellbore formed in a subsurface formation, the apparatus comprising: a generator assembly disposed on the tubular string and configured to output power to a downhole tool, the generator assembly including, a first generator configured to output a first power to the downhole tool; and a second generator configured to function as an exciter for the first generator.

Implementation #2: The apparatus of Implementation #1, the first generator comprising: a first turbine; a first rotor disposed on the first turbine; one or more field coils at least partially surrounding the first rotor; and a first stator configured to output the first power to the downhole tool.

Implementation #3: The apparatus of Implementation #2, wherein outputting the first power comprises rotating the first rotor, via a flow of fluid interacting with the first turbine as the fluid flows through the tubular string, to induce a first current on the first stator.

Implementation #4: The apparatus of Implementations #2 or #3, the second generator comprising: a second turbine; a second rotor including one or more permanent magnets, the second rotor disposed on the second turbine; and a second stator configured to output a second power to the one or more field coils at least partially surrounding the first rotor.

Implementation #5: The apparatus of Implementation #4, wherein outputting the second power comprises rotating the second rotor, via a flow of fluid interacting with the second turbine as the fluid flows through the tubular string, to induce a second current on the second stator.

Implementation #6: The apparatus of Implementations #4 or #5, wherein the second generator increases a magnetic field of the first rotor via the second power output from the second stator.

Implementation #7: The apparatus of any one or more of Implementations #1-6, wherein the downhole tool includes an inflow control device.

Implementation #8: The apparatus of any one or more of Implementations #1-7, further comprising: a rectifier, wherein the rectifier rectifies the first power output by the first generator to the downhole tool.

Implementation #9: A system comprising: a tubular string positioned in a wellbore positioned in a subsurface formation; a downhole tool disposed on the tubular string; and a generator assembly disposed on the tubular string and configured to output power to the downhole tool, the generator assembly including, a first generator configured to output a first power to the downhole tool; and a second generator configured to function as an exciter for the first generator.

Implementation #10: The system of Implementation #9, the first generator comprising: a first turbine; a first rotor disposed on the first turbine; one or more field coils surrounding the first rotor; and a first stator configured to output the first power to the downhole tool.

Implementation #11: The system of Implementation #10, wherein outputting the first power comprises rotating the first rotor, via a flow of fluid interacting with the first turbine as the fluid flows through the tubular string, to induce a first current on the first stator.

Implementation #12: The system of Implementations #10 or #11, the second generator comprising: a second turbine; a second rotor including one or more permanent magnets, the second rotor disposed on the second turbine; and a second stator configured to output a second power to the one or more fields coil surrounding the first rotor.

Implementation #13: The system of Implementation #12, wherein outputting the second power comprises rotating the second rotor, via a flow of fluid interacting with the second turbine as the fluid flows through the tubular string, to induce a second current on the second stator.

Implementation #14: The system of Implementations #12 or #13, wherein the second generator increases a magnetic field of the first rotor via the second power output from the second stator.

Implementation #15: The system of any one or more of Implementations #9-14, wherein the downhole tool includes an inflow control device.

Implementation #16: A method comprising: positioning a tubular string in a wellbore formed in a subsurface formation, wherein a downhole tool is disposed on the tubular string; and outputting power, via a generator assembly disposed on the tubular string, to the downhole tool, the generator assembly including, a first generator configured to output a first power to the downhole tool; and a second generator configured to increase the first power by increasing a magnetic field of a first rotor of the first generator.

Implementation #17: The method of Implementation #16, the first generator comprising: a first turbine, wherein the first rotor is disposed on the first turbine; one or more field coils surrounding the first rotor; and a first stator configured to output the first power to the downhole tool.

Implementation #18: The method of Implementation #17, wherein outputting the first power comprises rotating the first rotor, via a flow of fluid interacting with the first turbine as the fluid flows through the tubular string, to induce a first current on the first stator.

Implementation #19: The method of Implementations #17 or #18, the second generator comprising: a second turbine; a second rotor including one or more permanent magnets, the second rotor disposed on the second turbine; and a second stator configured to output a second power to the one or more field coils surrounding the first rotor.

Implementation #20: The method of Implementation #19, wherein outputting the second power comprises rotating the second rotor, via a flow of fluid interacting with the second turbine as the fluid flows through the tubular string, to induce a second current on the second stator.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B. C} or any combination thereof, including multiples of any element.

The invention claimed is:

1. An apparatus configured to be positioned on a tubular string in a wellbore formed in a subsurface formation, the apparatus comprising:
 a generator assembly disposed on the tubular string and configured to output power to a downhole tool, the generator assembly including,
  a first generator configured to output a first power to the downhole tool; and
  a second generator having one or more permanent magnets and configured to function as an exciter for the first generator.

2. The apparatus of claim 1, the first generator comprising:
 a first turbine;
 a first rotor disposed on the first turbine;
 one or more field coils at least partially surrounding the first rotor; and
 a first stator configured to output the first power to the downhole tool.

3. The apparatus of claim 2, wherein outputting the first power comprises rotating the first rotor, via a flow of fluid interacting with the first turbine as the fluid flows through the tubular string, to induce a first current on the first stator.

4. The apparatus of claim 2, the second generator comprising:
 a second turbine;
 a second rotor including the one or more permanent magnets, the second rotor disposed on the second turbine; and
 a second stator configured to output a second power to the one or more field coils at least partially surrounding the first rotor.

5. The apparatus of claim 4, wherein outputting the second power comprises rotating the second rotor, via a flow of fluid interacting with the second turbine as the fluid flows through the tubular string, to induce a second current on the second stator.

6. The apparatus of claim 4, wherein the second generator increases a magnetic field of the first rotor via the second power output from the second stator.

7. The apparatus of claim 1, wherein the downhole tool includes an inflow control device.

8. The apparatus of claim 1, further comprising:
 a rectifier, wherein the rectifier rectifies the first power output by the first generator to the downhole tool.

9. A system comprising:
 a tubular string positioned in a wellbore positioned in a subsurface formation;
 a downhole tool disposed on the tubular string; and
 a generator assembly disposed on the tubular string and configured to output power to the downhole tool, the generator assembly including,
  a first generator configured to output a first power to the downhole tool; and
  a second generator having one or more permanent magnets and configured to function as an exciter for the first generator.

10. The system of claim 9, the first generator comprising:
 a first turbine;
 a first rotor disposed on the first turbine;
 one or more field coils surrounding the first rotor; and
 a first stator configured to output the first power to the downhole tool.

11. The system of claim 10, wherein outputting the first power comprises rotating the first rotor, via a flow of fluid interacting with the first turbine as the fluid flows through the tubular string, to induce a first current on the first stator.

12. The system of claim 10, the second generator comprising:
 a second turbine;
 a second rotor including the one or more permanent magnets, the second rotor disposed on the second turbine; and
 a second stator configured to output a second power to the one or more fields coil surrounding the first rotor.

13. The system of claim 12, wherein outputting the second power comprises rotating the second rotor, via a flow of fluid interacting with the second turbine as the fluid flows through the tubular string, to induce a second current on the second stator.

14. The system of claim 12, wherein the second generator increases a magnetic field of the first rotor via the second power output from the second stator.

15. The system of claim 9, wherein the downhole tool includes an inflow control device.

16. A method comprising:
 positioning a tubular string in a wellbore formed in a subsurface formation, wherein a downhole tool is disposed on the tubular string; and
 outputting power, via a generator assembly disposed on the tubular string, to the downhole tool, the generator assembly including,
  a first generator configured to output a first power to the downhole tool; and
  a second generator having one or more permanent magnets and configured to increase the first power by increasing a magnetic field of a first rotor of the first generator.

17. The method of claim 16, the first generator comprising:
- a first turbine, wherein the first rotor is disposed on the first turbine;
- one or more field coils surrounding the first rotor; and
- a first stator configured to output the first power to the downhole tool.

18. The method of claim 17, wherein outputting the first power comprises rotating the first rotor, via a flow of fluid interacting with the first turbine as the fluid flows through the tubular string, to induce a first current on the first stator.

19. The method of claim 17, the second generator comprising:
- a second turbine;
- a second rotor including the one or more permanent magnets, the second rotor disposed on the second turbine; and
- a second stator configured to output a second power to the one or more field coils surrounding the first rotor.

20. The method of claim 19, wherein outputting the second power comprises rotating the second rotor, via a flow of fluid interacting with the second turbine as the fluid flows through the tubular string, to induce a second current on the second stator.

* * * * *